United States Patent [19]
Colton et al.

[11] 3,867,579
[45] Feb. 18, 1975

[54] SYNCHRONIZATION APPARATUS FOR A TIME DIVISION SWITCHING SYSTEM

[75] Inventors: John Robert Colton, Freehold; Henry Mann, Holmdel, both of N.J.

[73] Assignee: Bell Telephone Laboratories, Incorporated, Murray Hill, N.J.

[22] Filed: Dec. 21, 1973

[21] Appl. No.: 427,068

[52] U.S. Cl. ...... 179/15 A, 179/15 BS, 178/69.5 R, 340/172.5, 179/18 ES

[51] Int. Cl. ........................................ H04j 3/06

[58] Field of Search .......... 179/15 BA, 15 BS, 15 A, 179/15 AT, 18 ES, 18 J; 178/69.5 R; 340/172.5; 325/38

[56] References Cited

UNITED STATES PATENTS

| | | | |
|---|---|---|---|
| 3,504,287 | 3/1970 | Deregnaucourt | 325/38 |
| 3,735,049 | 5/1973 | Buchner | 179/15 A |
| 3,761,619 | 9/1973 | Pommerening | 179/15 AT |
| 3,786,435 | 1/1974 | Sherman | 340/172.5 |
| 3,800,290 | 3/1974 | Croxon | 179/15 A |

*Primary Examiner*—Ralph D. Blakeslee
*Attorney, Agent, or Firm*—John K. Mullarney

[57] ABSTRACT

A pair of data stores are provided for each incoming multiplex line to a time division switch and successive frames of incoming data are alternately written into the stores using recovered line timing. The data is alternately read out of the stores and read out is generally phase shifted with respect to write in such that the write in to one store occurs simultaneously with the read out from the other. The recovered line timing used to write the data stores for a given line is not synchronized to the office timing used to read these stores and consequently more or less information can be written into the stores than is read out of them. To deal with this problem, a "slip" control circuit is used to compare the read and write cycles and when the read cycle effectively drifts or shifts to a predetermined extent in either direction relative to the write cycle, the control circuit operates on the read cycle to discard a frame of data or to double-read a frame of data, depending on the relative direction of drift between the read and write cycles.

8 Claims, 4 Drawing Figures

SYNCHRONIZATION APPARATUS FOR A TIME DIVISION SWITCHING SYSTEM

BACKGROUND OF THE INVENTION

This invention relates to time division switching systems and, more particularly, to apparatus for achieving synchronization at a switching center in an essentially asynchronous, time division multiplex, communication system.

Communication systems in which signals are time division multiplexed for transmission require some means for determining the precise time of arrival of each discrete bit or sequence of bits in a repetitive frame interval. This can be accomplished if the sampling clocks for the various coders and decoders (i.e., codecs) are locked to the same master frequency or, alternatively, to a reference phase or frequency which is the average of all phases or frequencies at the several codec locations of the communication system. This latter technique, known as phase averaging, permits the clocks of all codec locations to be frequency locked, yet does not establish any individual clock as a master. In a large scale network, however, such as a nationwide telephone system, the codecs are scattered throughout the country and the problem of locking the frequency of all codecs to a common or master clock frequency becomes exceedingly complex and expensive. For a discussion of these synchronous techniques and their attendant disadvantages, attention is directed to the article "Experimental 224 Mb/s PCM Terminals" by J. S. Mayo, *The Bell System Technical Journal*, Vol. 34, November, 1965, pp. 1,813- 1841.

A number of asynchronous multiplexing techniques have been developed heretofore which do not require that all codec clocks be synchronized. In one such technique, known as "pulse stuffing," a coder does not provide as many pulses per second as the multiplexer needs, and the multiplexer is arranged to skip over occasional time slots so as to make up the frequency difference. The multiplexer then communicates to the demultiplexer the precise locations of the "stuffed" time slots. The demultiplexer removes the stuffed slots from the pulse stream, closes the time gaps occupied by the stuffed slots, and thus returns the pulse stream to its original form. Pulse stuffing, however, is a rather complex technique that is impractical for a large scale, real time limited system such as the No. 4 ESS (see the article "No. 4 ESS — Long Distance Switching for the Future" by G. D. Johnson, *Bell Laboratories Record, September*, 1973, pages 226-232) for the reason that much, or all, of the central processor's time would be used up in the handling of the many stuffing and destuffing operations and keeping track of the resulting many different frequencies coexisting in the machine.

The patent to M. B. Brilliant, U.S. Pat. No. 3,558,823, issued Jan. 26, 1971, discloses another asynchronous multiplex technique wherein the cross-office channels assigned to carry the digitally encoded signals between the input and output ports of a time division switch are chosen to provide the greatest margin for phase or frequency drift between the office clocks. Thus, for this purpose, certain other cross-office channels are forbidden so as to achieve the desired margin for anticipated phase drift. A solution to the synchronization problem is accordingly realized, but at the cost of an increase in the probability of message blocking. In a large scale communication network such as the No. 4 ESS this increase in blocking probability would be intolerable.

SUMMARY OF THE INVENTION

It is the primary object of the invention to achieve synchronization at a switching center in an asynchronous, time division multiplex, communication network.

A related object is to provide an improved yet simplified circuit for effecting synchronization at a stored-program-controlled switching machine without infringing upon the time of the processing unit while maintaining frame integrity.

The multiplexed data transmitted to a switching center in a large scale, time division multiplex, communication network is typically asynchronous due to jitter, delay variations and independent or imperfectly synchronized office clocks. To synchronize each incoming multiplex line to the office timing, a pair of data stores are provided for each line and successive frames of incoming data are alternately written into the stores using recovered line timing. The data is alternately read out of store and read out is generally phase shifted with respect to write in such that the write in to one store occurs simultaneously with the read out from the other. However, the recovered line timing used to write the receive data stores for a given line is not synchronized to the office timing which is used to read these stores and, as a result, more or less information can be written into the stores than is read out of them, causing an overflow or depletion of the receive stores. To deal with this problem, a "slip" control circuit is used to compare the read and write cycles and when the read cycle effectively drifts or shifts to a predetermined extent in either direction relative to the write cycle, the control circuit operates on the read cycle to discard a frame of data or to double-read a frame of data, depending on the relative direction of drift between the read and write cycles. The resultant impairment to transmitted signals is minimal, since a frame of multiplexed data comprises a plurality of distinct message words in distinct multiplexed channels of the frame and one lost or duplicated digital word per message is not significant. Also, the frequency of a frame deletion or double-reading is small and it is always exactly one frame of data that is affected.

It is a particularly advantageous feature of the invention that the receive data stores can be used to facilitate the multiplexing of the incoming multiplex bit streams to a higher order multiplex bit stream — i.e., a multi-multiplexed digital bit stream.

It is a further feature of the invention that the operation of the slip control circuit will not affect frame synchronization; that is, it will not initiate any reframing sequence, even though a frame of data may be lost or duplicated.

BRIEF DESCRIPTION OF THE DRAWINGS

The invention will be more fully appreciated from the following detailed description when the same is considered in connection with the accompanying drawings in which.

DETAILED DESCRIPTION

Figure 1:
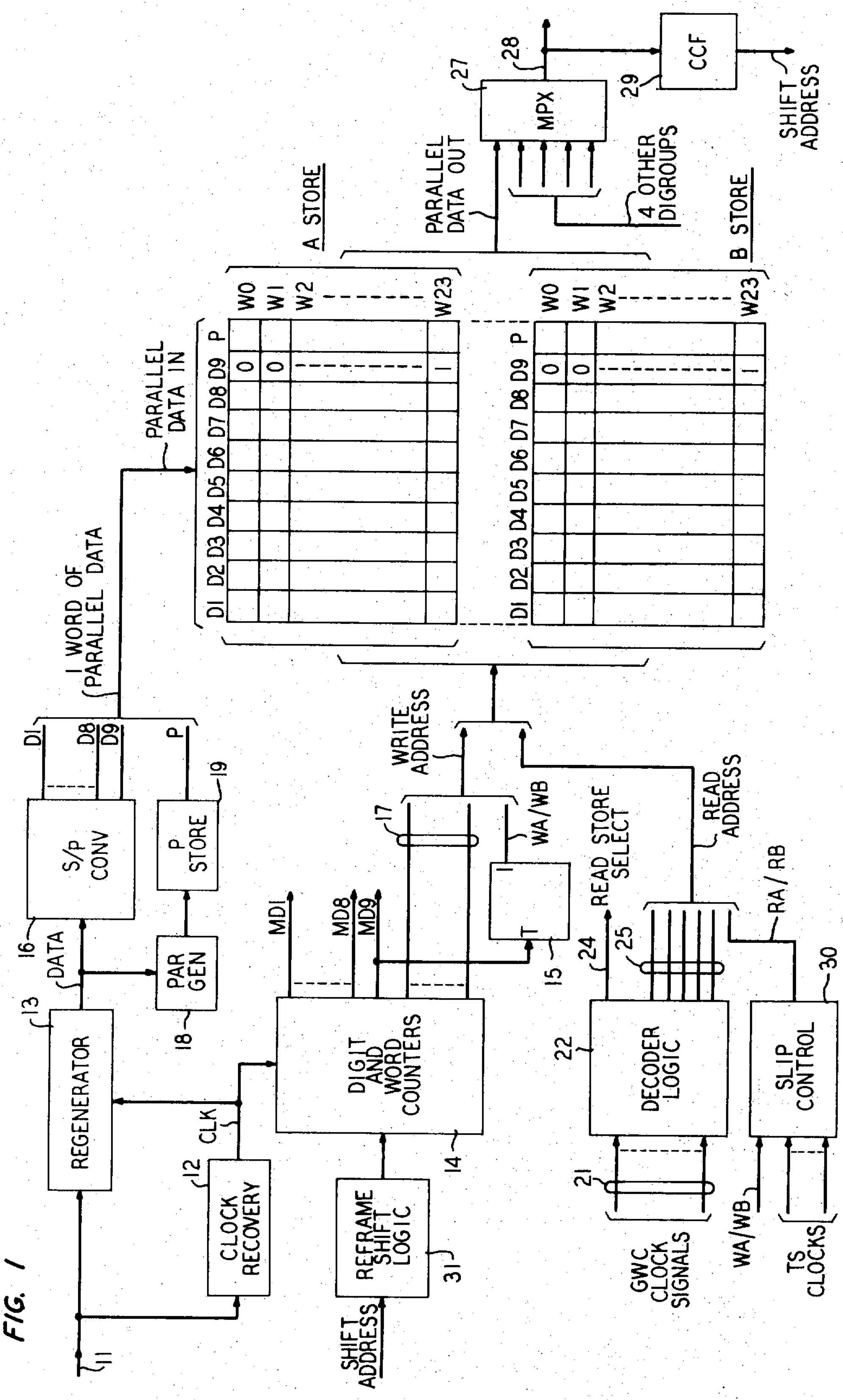
FIG. 1 is a simplified schematic block diagram of a portion of a time division switching machine incorporating the apparatus of the present invention.

Turning now to FIG. 1 of the drawings, there is shown part of a time division switching system which incorporates synchronization apparatus in accordance with the invention. For purposes of illustration, the schematic block diagram of FIG. 1 has a configuration similar to that used by the No. 4 ESS, noted above. It is to be understood, however, that the switching system itself constitutes no part of the present invention and it will be obvious to those in the art that the inventive concepts here disclosed can be used with other and different time division switching systems. The incoming transmission line 11 carries a digital group (digroup) of separate and distinct messages in a typical time division multiplexed fashion. Again for purposes of illustration, the data transmitted over line 11 can be assumed to have a format similar to the data format transmitted to a No. 4 ESS office over a T1 transmission line (see, for example, the article "The D3 Channel Bank" by W. B. Gaunt et al., *Bell Laboratories Record, August*, 1972, pp. 229–233). This data format is shown in an abbreviated form, in the expanded view of digroup 2, in FIG. 3 of the drawings. The format consists of twenty-four 8-bit words and one framing bit for a total of 193 bits per frame. The 24 words typically represent 24 separate and distinct messages deposited in 24 separate and distinct channels 0–23. The words are PCM (pulse code modulation) encoded and the least significant bit (i.e., eighth bit) of a channel is periodically dedicated for supervisory signaling purposes. This dedication is discussed in detail in the article by Gaunt et al, supra, but it is of no consequence in the consideration of the present invention. The PCM encoded data words can represent encoded voice or video information, digital data from a data set, etc. For present purposes it is convenient to consider the 193rd bit (i.e., the framing bit) as a part of the last word (W23) of a frame. As suggested in FIG. 3, and as will be described in detail hereinafter, five digroups of 24 channels each are multiplexed on to a 128 time-slot bus. Of these 128 time-slots or channels, 120 time-slots are utilized for traffic ($5 \times 24 = 120$) and eight are spares that may be used for maintenance testing and the like.

The received digroup is delivered to the clock recovery circuit 12 and to the regenerator 13. The circuit 12 recovers the line timing of the incoming T1 line 11 and serves to generate coincident clock pulses at the incoming line rate (1.544 MHz). These clock pulses are delivered to the regenerator 13 and to the digit and word counters circuitry 14. As the name implies, the regenerator 13 serves to regenerate the received digital bits, degraded in transmission, and it further converts the same from a bipolar to a unipolar format.

The output clock pulses of clock recovery 12 are serially delivered to the circuit 14 which comprises a digit counter and a word counter (not shown). If we assume a normal in-frame synchronous condition for the incoming digroup, the digit counter of circuit 14 will produce marker digits MD–1 through MD–8, on the respective similarly designated output leads, which are in time coincidence with the data bits (D1 – D8) of the data words at the output of regenerator 13. These marker digits MD–1 through MD–8 are utilized in other and different circuits of the time division switching machine and thus can be disregarded for present purposes. However, for every 24 word (i.e., W 23) the marker digit MD–9 is produced, on the designated output lead, in time coincidence with the regenerated framing bit (193rd bit) at the output of regenerator 13. This marker digit MD–9 is delivered to the toggle input of flip-flop 15 for a purpose to be made evident hereinafter. A word counter in cicuit 14 increments each time the digit counter counts a complete word. The word counter counts through 24 words and then recycles. Assuming an in-frame situation, the word counter will count from 0 through 23 in time coincidence with the appearance of data words WO through W23 at the output of regenerator 13. Thus, the word counter indicates the "address" (e.g., the position in the frame) of each data word. In accordance with binary notation, at least five binary digits are required to indicate a count of 24. It is these five bits that are used to write the data words in the appropriate positions in the data stores.

The serial data output of regenerator 13 is delivered to the serial-to-parallel converter 16 wherein the successive digital words (WO – W23) are successively converted to a parallel bit format. The conversion of a data word to a parallel format occurs in time coincidence with the appropriate designation of that word on address leads 17; this results in the data word being written into store. All of the data words except the last (W23) are 8-bit words and hence the D9 bit, on the similarly designated output lead of converter 16, is typically a logical or binary "0". The 193rd or framing bit (D9 bit) is considered part of the last word (W23) and hence with the occurrence of word W23 this D9 bit may be a binary "1" or 0 in accordance with the framing pattern. The D9 bit is written into store along with the data bits D1 – D8 of data word W23.

The parity generator 18 counts the number of binary 1 bits, for example, in a data word and adds a parity bit, where appropriate, for "odd" parity check purposes. This parity bit is first placed in the single-cell store 19 and is then read out therefrom along with the data word from converter 16. The parity check itself is carried out at a later stage in the switching operation and therefore can be disregarded for present purposes.

The data stores A and B are each organized as a 24 word by 10 bits per word random access memory. When the digroup is in frame, the A and B receive data stores each store a complete frame of data including the framing bit, plus a parity bit for each channel of the frame. As symbolically shown in FIG. 1, the data words W0 – W23 are stored in successive rows of each store along with a D9 bit (which is a binary 0 for all but the last word) and a parity bit (P). Successive frames of incoming data are alternately written into the A and B stores in the manner to be described. and a number might be advantageously Each receive data store comprises a static MOS (metal oxide semiconductor) store with random access memory and conventional address decoding logic. In practice, the A and B storage matrices would simply comprise separate and distinct portions of a larger storage matrix. Data stores are, of course, well known in the art and a number of prior art storage arrangements might be advantageously utilized herein.

As previously indicated, the successive frames of incoming data are alternately written into the A and B stores. The 5-bit write address information on leads 17 serves to designate the storage location or row for the parallel data word output from the S/P converter 16. And, successive data words are written into successive storage locations as the 5-bit write address successively increments from 0 through 23. The output of flip-flop 15 selects the data store (A or B) and thus it comprises part of the write address information.

The marker digit MD–9 is produced once per frame, as previously described, and in time coincidence with the framing bit of the data. This marker digit is coupled from circuit 14 to the toggle flip-flop 15 to successively alter its output as indicated by the waveform (WA/WB) of FIG. 4. It is these successive alternations of the toggle flip-flop 15 that serve to alternately enable the data stores A and B for write purposes.

The line transmission rate is given as 1.544 MHz, there are 193 bits per frame, and the duration of each line frame is 125 microseconds, which is subdivided into channels of 5.18 microseconds each. This frame duration of the switching office at a corresponding 125 microseconds. The office 125 microsecond frame is divided into 128 time periods, referred to hereinafter as time-slots or channels. Five digroups of 24 channels each are multiplexed on to a 128 time-slot bus, in the manner to be described, leaving eight spare time-slots. The use of these spare time-slots can be disregarded for present purposes. Each write cycle or write operation requires an entire frame (125 microseconds). However, since five digroups are multiplexed on to a common bus in the same time duration (125 microseconds), as illustrated in FIG. 3, the read cycle of a given digroup is only about 20 percent of the time required for a write cycle.

Returning again to FIG. 1, the read cycle will now be described. Amongst other timing signals, the office clock (not shown) generates GWC (generated word code) clock signals that serve to define the 128 time-slots of the office frame. These GWC clock signals are delivered over seven leads 21 ($2^7 = 128$) to the decoder logic 22. The logic circuitry 22 decodes these clock signals in a manner such that the five output leads 25 increment through a count of 0 through 23 for five successive cycles; in binary notation, at least five binary digits are required for a count of 24. It is this count or 5-bit address information on leads 25 that is used to read the data words from the respective locations in all of the data stores. After five successive count cycles of 0 – 23 are registered on leads 25, the operation is interrupted for a period of eight time-slots (i.e., time-slots 120 – 127 which are spares) and then it repeats. The "read store select" lead 24 is energized for a predetermined one of the five cycles and it serves to enable the data read out of the digroup associated with stores A and B. There are four other read store select leads (not shown) and each is respectively energized during a given one of the five cycles to enable the read out of a given digroup.

Figure 2:
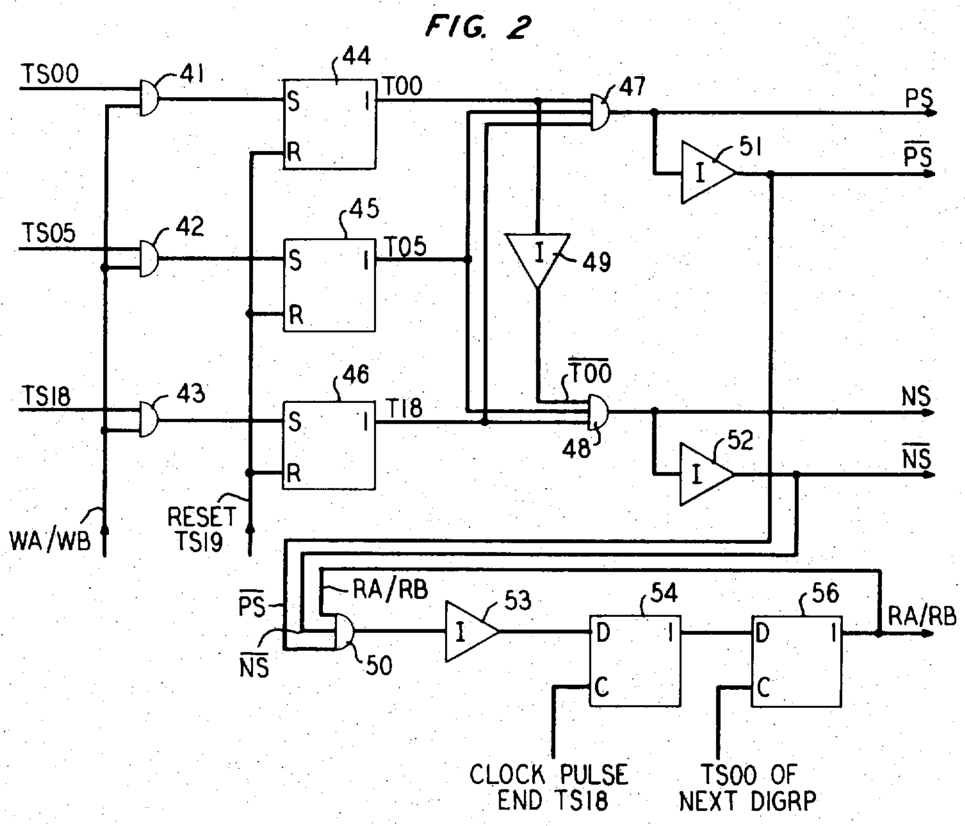
FIG. 2 is a detailed schematic diagram of the slip control circuit of FIG. 1.

The slip control circuit 30 generates an output signal (RA/RB), in a manner to be described, which serves to alternately enable the read out from stores A and B; this output signal thus comprises part of the read address information for stores A and B. The output waveform of slip control 30 is such that data is typically read out of stores A and B in an alternate fashion and read out is generally phase shifted with respect to write in such that the read out of one store occurs simultaneously with the write into the other. However, when the read cycle effectively drifts or shifts to a predetermined extent in either direction relative to the write cycle, the slip control 30 operates on the read cycle to discard a frame of data or to double-read a frame of data, depending on the relative direction of drift between the read and write cycles. It should be evident from the foregoing description that the decoder 22 is common to all five digroups that are multiplexed together, but a slip control circuit 30 must be provided on a per digroup basis. The details of the slip control circuit 30 are shown in FIG. 2, which will be later described.

Figure 3:
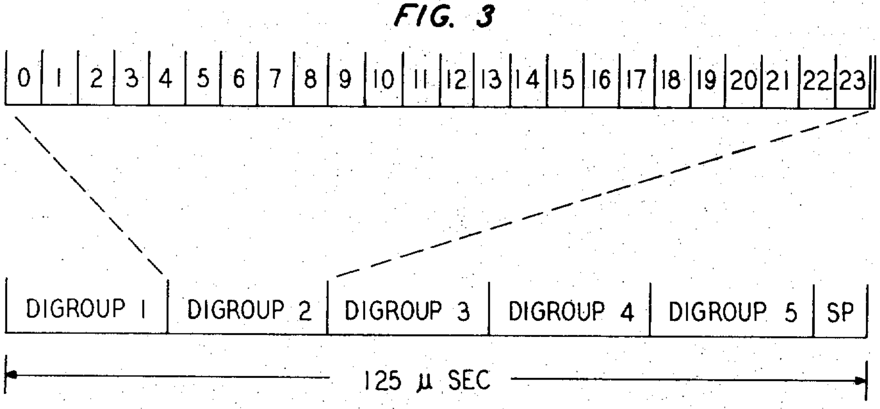
FIG. 3 illustrates the data format of a typical incoming multiplex line.

As the five "read store select" leads (e.g., lead 24) of decoder 22 are successively energized the data stores of five digroups are read in succession and the digroups multiplexed together in multiplexer 27 to form a multiplexed bit stream as depicted in FIG. 3. Thus, the 24 channels of digroup 1 are read, then the 24 channels of digroup 2, and so on for the other three digroups. The eight spare time slots separate the data from channel 23 of digroup 5 and channel O of digroup 1. The data words are read out of store in a parallel format and they remain in a parallel format on the bus 28.

With the exception of the slip control circuit 30, the individual circuits recited above and shown in block form in FIG. 1 of the drawings are considered to be well known in the art and amply described in the literature as to obviate the necessity of a detailed description herein.

The framer 29 examines a digroup for frame synchronization by comparing the framing bits thereof against those of a locally generated framing pattern. If the comparison is successful, the digroup is in-frame and no corrective action need be taken. If the comparison fails, however, an out-of-frame condition is indicated and a "hunting" procedure is initiated. To this end, a "shift address" signal is sent from the framer 29 to the reframe shift logic 31 for the purpose of temporarily interrupting the counting operation of the digit and word counters circuit 14. This hunting operation continues, and the count of circuit 14 continually interrupted, until an inframe condition is once again realized, i.e., the bits of data on the bus 28 are once again successfully compared with the locally generated framing pattern.

The framer 29 can be a common control framer CCF (i.e., it can be time-shared by the five digroups) since loss of frame is a relatively infrequent occurrence. Alternatively, of course, a framer can be provided on a per digroup basis, i.e., one framer per digroup. The art is replete with framers and so no detailed description of the same is deemed necessary for purposes of the present invention. Further, the framing function itself plays no part in the operation of the present invention. As with most framing algorithms, the data is typically transmitted through the terminal during the process of reframing.

Figure 4:
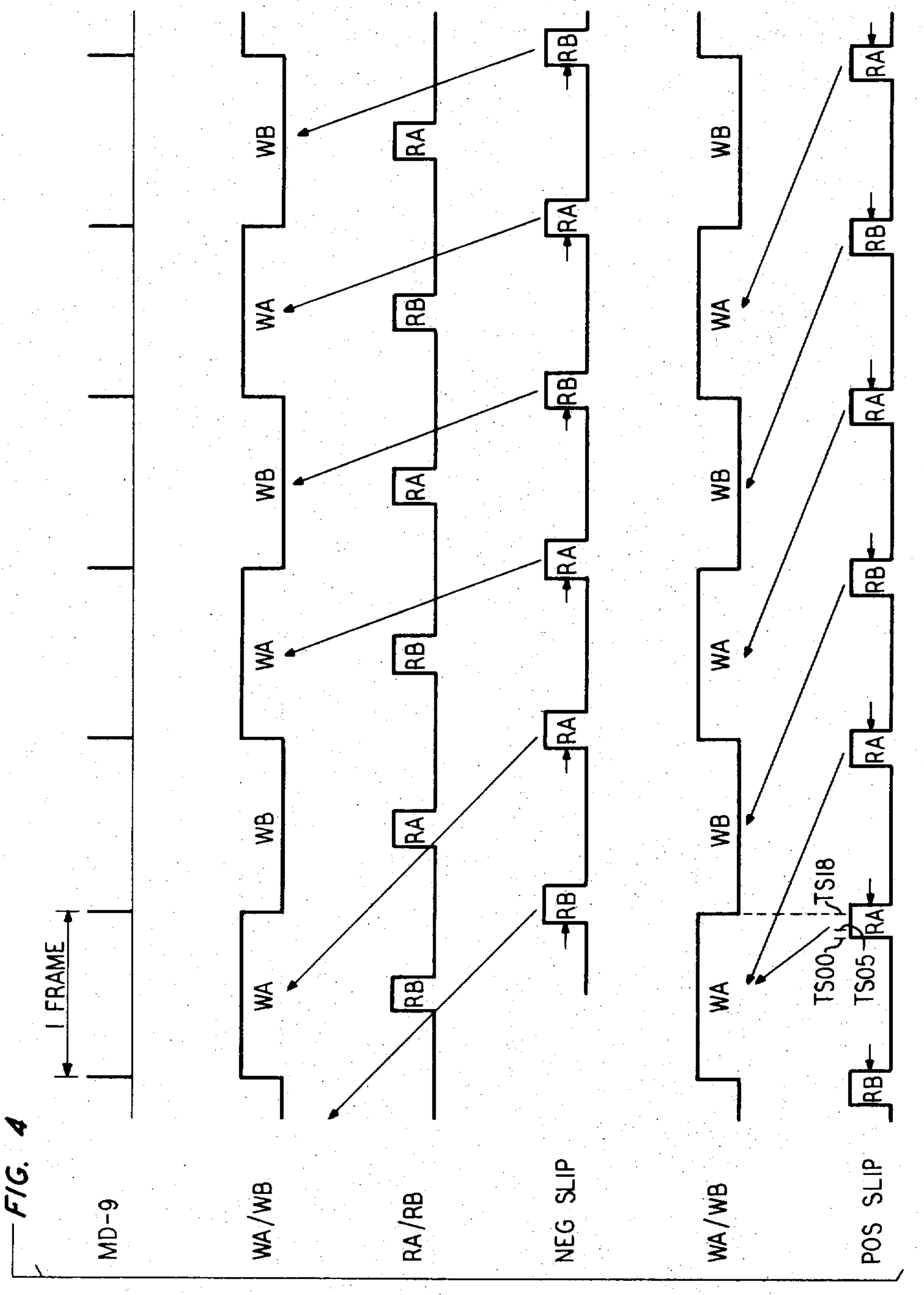
FIG. 4 shows a series of waveforms useful in explaining the operation of the present invention.

Turning now to the slip control circuit 30 and its mode of operation, reference should first be had to the illustrative waveforms of FIG. 4. The first waveform shows the marker digits MD–9 which are responsible for the generation of the write cycle waveform WA/WB (directly therebelow) in the manner previously described. During the designated WA portion of this latter waveform a frame of data is written into store A, and during the WB portion into store B. The RA/RB waveform corresponds to the read cycle for this digroup. During the RA period of the RA/RB waveform, a frame of data is read out of store A, and during the RB period of the waveform store B is read. As suggested in FIG. 4, store B is being read while store A is written, and vice versa. However, if the recovered line frequency is greater than the office frequency, for example, the read waveform RA/RB will move or shift toward the right relative to the write waveform WA/WB. This condition is illustrated by the FIG. 4 waveform designated "Neg. Slip," i.e., negative slip. When more than three-fourths of the RA waveform advances into the WA waveform, the slip control causes the A receive store to be read twice in succession. For this direction of slip, the result is a deletion of the frame in the B store. This deletion is indicated in FIG. 4 by the arrows directed from the Neg. Slip waveform toward the WA/WB waveform. As indicated, when a negative slip condition exists, the RA cycle is repeated with the result that store A is read twice in succession and the frame placed in store B is deleted; i.e., the data corresponding to one WB waveform is skipped. Thereafter, the A and B stores are once again read in a continuous alternating fashion.

Alternatively, of course, the recovered line frequency may be somewhat less than the office frequency and hence the read cycle will move or shift toward the left relative to the write cycle. This condition is depicted by the last two illustrated waveforms of FIG. 4. For purposes of clarity the write cycle waveform WA/WB is repeated. In contrast to the previously described slip condition, this relative shift of the read cycle is designated "Pos. Slip," i.e., positive slip. When more than three-fourths of the RA waveform advances into the WA waveform, the slip control causes the A receive store to be read twice in succession. For this direction of slip, the result is a repetition of the frame in the A store. This repetition is indicated in FIG. 4 by the arrows directed from the Pos. Slip waveform toward the WA/WB waveform. As indicated, when a positive slip condition exists, the RA cycle is repeated with the result that store A is read twice in succession. Thereafter, the A and B stores are once again read in a continuous alternating fashion.

The read cycle consists of 24 time slots (TS00–TS23) and, as indicated in FIG. 4, the positive slip operation occurs in the RA cycle at TS18. If the recovered line frequency remains less than the office frequency, the read cycle will, of course, continue to move to the left relative to the write cycle; but a drift equivalent to a whole frame (i.e., 125 microseconds) can be sustained before necessitating another slip operation (i.e., a double-reading of store A). It is highly unlikely that such a drift will ever be experienced during the typical call. The same is true, of course, for the situation where the recovered line frequency is, and remains, greater than the office frequency.

After a positive slip operation has been effected (i.e., a double-reading of store A) it is possible that delay variations and jitter may now reverse the instantaneous line frequency/office frequency relationship. Such negative movement can be sustained until the RA waveform advances into the WA waveform to TS05 (of RA). At this point, another (negative) slip operation occurs which deletes the frame in the B store as previously described. The significance of the foregoing explanation is primarily to point out that the circuitry incorporates a built-in "hysteresis" effect; i.e., a duration of 13 microseconds is provided TS05 – TS18) after a slip operation during which delay perturbations and jitter can be sustained without necessitating any additional slip operation.

Turning now to the slip control circuit 30 shown in detail in FIG. 2 of the drawings, the write cycle waveform WA/WB is delivered to the input of each of the AND gates 41 – 43, and the TS00, TS05 and TS18 pulses of the read cycle for this digroup are rsspectively connected to the gates 41, 42 and 43. The signals designated TS00, TS05 and TS18 are logical or binary 1 pulses derived from decoder 22. If the WA/WB waveform is in a logical 1 state (i.e., the WA portion of the write cycle) simultaneously with the occurrence of one or more of the TS00, TS05 or TS18 pulses, one or more of the gates 41 – 43 will be enabled to set the respective flip-flops 44 – 46 to the logical 1 state. In practice, the flip-flops 44 – 46 will likely comprise gated delay flip-flops (GDFF) along with flip-flops 54 and 56 to be described hereinafter. However, for present purposes they can be considered to comprise the more common type of set-and-reset flip-flop. When one or more of the flip-flops 44 – 46 is set to its logical 1 state, this indicates that the RA waveform has advanced, in one direction or the other, into the WA waveform. The T00, T05 and T18 outputs of flip-flops 44 – 46 are connected to the AND gates 47 and 48 in the indicated manner. The T00 output of flip-flop 44 is inverted by inverter 49 prior to its delivery to AND gate 48.

When the flip-flops 44 – 46 are all set to their logical 1 state, as previously described, the condition illustrated by the Pos. Slip waveform of FIG. 4 prevails and a positive slip operation is called for. The AND gate 47 is thus enabled and its PS output lead (indicative of positive slip) is a logical 1. The output of AND gate 47 is inverted in inverter 51 and hence when the PS output is high or a logical 1, the PS output of inverter 51 is low or at a logical 0 state. In the absence of positive slip, the PS output is, of course, normally a logical 1.

When the flip-flops 45 and 46 are set to their logical 1 state, with flip-flop 44 in its reset or logical 0 state, the AND gate 48 is enabled and its NS output lead (indicative of negative slip) is a logical 1. This condition is indicative of the Neg. Slip situation illustrated by the similarly designated waveform of FIG. 4 and a negative slip operation is called for. The output of AND gate 48 is inverted in inverter 52 and hence when the NS output is high, the NS output is low or at a logical 0 state. Again, in the absence of negative slip, the NS output is, of course, normally a logical 1. The PS, PS, NS and NS outputs are delivered to a number of circuits (not shown) of the time division switching machine and can, by and large, be disregarded for present purposes. The flip-flops 44 – 46 can be reset by a strobe pulse during time slot 19 to return the same to their initial state.

The PS and NS output leads of inverters 51 and 52 are connected to the input of AND gate 50. The output of gate 50 is inverted by circuit 53 and thence coupled to the delay (D) input of the gated delay flip-flop (GDFF) 54. The output of flip-flop 54 is coupled to the D input of GDFF 56 and its output lead RA/RB comprises part of the read address information for stores A and B (refer to FIG. 1). The output of flip-flop 56 is also connected back to the input of AND gate 50.

For purposes of explanation, let us assume that the output of flip-flop 56 is presently a logical or binary 0.

For this output, store B will be read. If no slip condition exists, as will be assumed, the PS and NS input signals to AND gate 50 will each be a logical 1. However, since the output of flip-flop 56 is presently a logical 0, the gate 50 remains disabled. The output of disabled gate 50 is inverted to deliver a logical 1 signal to the D input of flip-flop 54. Then when a clock pulse occurs at the end of time slot TS18 of the read cycle of the digroup, the logical 1 input to flip-flop 54 is transferred therethrough to the D input of flip-flop 56. A strobe pulse, from decoder 22, during time slot TS00 of the next digroup is coupled to the clock (C) input of flip-flop 56 and thereby serves to transfer the logical 1 input to the output lead RA/RB. When the output of flip-flop 56 is a logical or binary 1, store A is now read instead of store B.

The logical 1 output of flip-flop 56 is coupled back to AND gate 50 and, again assuming no slip condition exists, the gate 50 will now be enabled. The output of enabled gate 50 is inverted to deliver a logical 0 signal to the D input of flip-flop 54. When the clock pulse occurs at the end of time slot TS18 of the next read cycle of the digroup, this input logical 0 signal will be transferred to the D input of flip-flop 56. And, once again, a strobe pulse during time slot TS00 of the next digroup will serve to transfer the logical 0 input to the output lead RA/RB. This, of course, results in a store B read operation. In this fashion, the RA/RB output of flip-flop 56 continually alternates to achieve an alternate reading of the A and B stores.

Now let it be assumed that store A is being read (the RA/RB output is a logical 1) and the RA waveform has advanced, in either direction, into the WA waveform to the previously designated extent. A positive or negative slip operation is thus called for and either PS or NS will be a logical 0. In either case, the AND gate 50 is thereby disabled. The output of disabled gate 50 is inverted to thus deliver a logical 1 signal to the D input of flip-flop 54. This logical 1 signal is then clocked through flip-flop 54 to the D input of flip-flop 56. During time slot TS00 of the next digroup this logical 1 signal is then transferred to the output lead RA/RB. That is, the RA/RB output remains a logical 1 and store A is thus read again. This double-reading of store A results in a frame of data being deleted or repeated as previously described, and as shown in FIG. 4.

To summarize the described operation:

If *RA/RB* = 0 Σ Read A next;

If *RA/RB* = 1 and (Pos. Slip = Neg. Slip = 0)
Read B next;

If *RA/RB* = 1 and (Pos. Slip + Neg. Slip = 1)
Read A again.

The foregoing disclosure relates to only a preferred embodiment of the invention disclosed in a particular designated time division switching environment. It should be obvious to those in the art that the invention can be used in other and different time division switching systems, and that numerous modifications and alterations may be made in the disclosed embodiment without departing from the spirit and the scope of the invention.

What is claimed is:

1. A time division switching system comprising a plurality of incoming lines, each line serving to carry digital data signals in time division multiplexed channels, a pair of receive data stores for each line, means for alternately writing the successive frames of data on a line into said pair of data stores, means for alternately reading out the data from each store in a manner such that the read out from one store generally occurs simultaneously with the write in to the other, control means for comparing the read and write store cycles for each line and for producing a control signal when the read and write cycles drift to a predetermined extent relative to each other, and means for coupling said control signal to the store read out means to cause the same to skip a frame of stored data or double-read a frame depending upon the relative direction of said drift.

2. A time division switching system as defined in claim 1 wherein said control means serves to generate a control signal when the read store cycle advances more than three-fourths into the write store cycle.

3. A time division switching system as defined in claim 2 including means for providing a circuit hysteresis effect for preventing repeated successive generation of the control signals during periods in which delay perturbations and jitter are sustained on a transmission line.

4. A time division switching system as defined in claim 3 including means for reading the data stores of a predetermined number of lines in succession so as to multiplex frames of data of said predetermined number of lines on to a multiplex bus.

5. A time division switching system as defined in claim 4 including means for adding parity check bits when appropriate to each of the multiplexed channels prior to the storage thereof.

6. A time division switching system as defined in claim 5 wherein said predetermined number is five.

7. In a stored-program-controlled time division switching machine, a plurality of incoming transmission lines, each transmission line serving to carry digital data signals in a predetermined number of time division multiplexed channels, a first and second receive data store for each line, means for alternately writing the successive frames of data on a transmission line into said first and second receive data stores, means for alternately reading out the data from said first and second stores a frame at a time and in a manner such that the read out from one store generally occurs simultaneously with the write into the other, a control means for each of said first and second receive data stores of each line, each control means serving to phase compare the read waveform of said first receive data store with the write waveform of said first receive data store for producing a first control signal when said read waveform effectively advances to a preselected extent in a given direction into said write waveform and for producing a second control signal when said read waveform effectively advances to a preselected extent in the opposite direction into said write waveform, and means for coupling said first and second control signals to the store read out means to cause the same to skip a frame of stored data when said first control signal is produced and to double-read a frame of stored data when said second control signal is produced, the relative direction of drift between said read and write waveforms being determinative of whether a frame of stored data is deleted or double-read.

8. A stored-program-controlled time division switching machine as defined in claim 7 including a means associated with each control means for providing a circuit hysteresis effect for preventing a rapid successive generation of first and second control signals during periods in which delay variations and jitter are encountered on a transmission line.

* * * * *

UNITED STATES PATENT OFFICE
CERTIFICATE OF CORRECTION

PATENT NO. : 3,867,579
DATED : February 18, 1975
INVENTOR(S) : John R. Colton - Henry Mann It is certified that error appears in the above-identified patent and that said Letters Patent are hereby corrected as shown below:

Col. 4, line 4, "24" should read --twenty-fourth--;
lines 56 and 57, delete "and a number might be advantageously".

Col. 5, line 21, after "duration" insert --, in turn, establishes the internal frame duration--.

Col. 8, line 38, "PS" should read --$\overline{PS}$--;
line 40, "PS" should read --$\overline{PS}$--;
line 49, "NS" should read --$\overline{NS}$--;
line 50, "NS" should read --$\overline{NS}$--;
line 51, "PS, PS, NS and NS" should read --PS, $\overline{PS}$, NS and $\overline{NS}$--;
line 57, "PS and NS" should read --$\overline{PS}$ and $\overline{NS}$--.

Col. 9 line 2, "PS and NS" should read --$\overline{PS}$ and $\overline{NS}$--;
line 35, "PS and NS" should read --$\overline{PS}$ and $\overline{NS}$--;
line 48, "Σ" should read --→--,
"next" should be underscored;

UNITED STATES PATENT OFFICE

CERTIFICATE OF CORRECTION

PATENT NO. : 3,867,579 Page - 2

DATED : February 18, 1975

INVENTOR(S) : John R. Colton - Henry Mann

It is certified that error appears in the above-identified patent and that said Letters Patent are hereby corrected as shown below:

Col. 9, line 49, after "(Pos. Slip = Neg. Slip = 0)" insert --→--;

line 50, "next" should be underscored;

line 51, after "(Pos. Slip + Neg. Slip = 1)" insert --→--;

line 52, "again" should be underscored.

Signed and sealed this 27th day of May 1975.

(SEAL)
Attest:

RUTH C. MASON
Attesting Officer

C. MARSHALL DANN
Commissioner of Patents
and Trademarks